United States Patent
Yamagata et al.

(10) Patent No.: US 8,255,438 B2
(45) Date of Patent: Aug. 28, 2012

(54) STORAGE CONTROL DEVICE

(75) Inventors: Naoki Yamagata, Shiki (JP); Toshiharu Matsuda, Soka (JP)

(73) Assignee: Nikon Corporation, Tokyo (JP)

( * ) Notice: Subject to any disclaimer, the term of this patent is extended or adjusted under 35 U.S.C. 154(b) by 461 days.

(21) Appl. No.: 12/385,698

(22) Filed: Apr. 16, 2009

(65) Prior Publication Data

US 2009/0327371 A1    Dec. 31, 2009

(30) Foreign Application Priority Data

Jun. 25, 2008    (JP) .................... 2008-165938

(51) Int. Cl.
G06F 12/00    (2006.01)

(52) U.S. Cl. .................................. 707/823

(58) Field of Classification Search ............ 369/47.13; 707/823, 824
See application file for complete search history.

(56) References Cited

U.S. PATENT DOCUMENTS

| | | | | |
|---|---|---|---|---|
| 7,898,913 B2* | 3/2011 | Ijtsma et al. | ............ | 369/47.13 |
| 2005/0055204 A1* | 3/2005 | Florencio et al. | ............ | 704/233 |
| 2005/0286855 A1* | 12/2005 | Saitou et al. | ............ | 386/46 |
| 2006/0107009 A1* | 5/2006 | Ooshima et al. | ............ | 711/163 |
| 2006/0252096 A1* | 11/2006 | Zha et al. | ............ | 435/7.1 |
| 2007/0088666 A1* | 4/2007 | Saito | ............ | 707/1 |
| 2007/0226445 A1* | 9/2007 | Nichols et al. | ............ | 711/170 |
| 2008/0043586 A1* | 2/2008 | Hwang et al. | ............ | 369/47.13 |
| 2008/0162786 A1* | 7/2008 | Shanmuganathan | ............ | 711/103 |
| 2008/0212422 A1* | 9/2008 | Brondijk et al. | ............ | 369/47.13 |
| 2008/0259751 A1* | 10/2008 | Nakamura et al. | ............ | 369/47.13 |
| 2009/0013023 A1* | 1/2009 | Kato et al. | ............ | 709/201 |

FOREIGN PATENT DOCUMENTS

| | | | |
|---|---|---|---|
| JP | A-2003-196142 | | 7/2003 |
| JP | 2006-252096 | * | 9/2006 |
| JP | A-2006-252096 | | 9/2006 |
| JP | A-2007-18528 | | 1/2007 |

* cited by examiner

Primary Examiner — Angela Lie
(74) Attorney, Agent, or Firm — Oliff & Berridge, PLC

(57) ABSTRACT

The storage control device includes: a control unit that stores a data file that includes main data and file information in a write-once type storage medium having a data information area containing a plurality of clusters having a predetermined size; an acquisition unit that acquire size information of the clusters from the storage medium; a calculation unit that calculates a number of clusters required for storing file information corresponding to each data file in data storing area using the number of data files to be stored in the storage medium, the size of file information, and the size information of the clusters; and a setting unit that sets a data information area corresponding to the number of clusters calculated by the calculation unit as a storage area for file information.

4 Claims, 5 Drawing Sheets

STORAGE CONTROL DEVICE

INCORPORATION BY REFERENCE

The disclosure of the following priority application is herein incorporated by reference:

Japanese Patent Application No. 2008-165938 filed Jun. 25, 2008

BACKGROUND OF THE INVENTION

1. Field of the Invention

The present invention relates to a storage control device that stores data in a write-once type storage medium.

2. Description of Related Art

Conventionally, there have been in widespread use electronic devices such as digital cameras to which a storage medium such as a memory card or a memory stick can be fitted. Such storage media include a storage medium that is rewritable, a write-once type storage medium that can be written only once, and soon. Japanese Patent Laid-open Publication No. 2007-18528 and Japanese Patent Laid-open Publication No. 2003-196142 disclose file administration technologies for write-once type storage media.

SUMMARY OF THE INVENTION

The storage media such as memory cards are mostly formatted using an FAT (File Allocation Tables) file system. The FAT file system includes an FAT constituted by FAT entries corresponding to respective data storage areas in units of clusters, a root directory, subdirectories, and directory entry area information for the subdirectories, file information on files stored in the subdirectories.

The directory entry area is a predetermined cluster in a data storage area assigned when subdirectories were created. In the directory entry there are stored a file name of a file that is stored in a subdirectory concerned and file information on the cluster in which the file is stored. Each time when a file is stored file information of, for example, 32 bytes is stored.

The FAT entry stores a cluster number that indicates the order in which the data is read out or a mark that indicates completion of the read out of the data and holds file data such as images or sounds or voices stored in the data storage area and link information such as file information.

When storing a file in a storage medium that has adopted the above-mentioned FAT file system is adopted, electronic devices such as personal computers (PC) and digital cameras sequentially write file information of each file in the directory entry area each time when they store a file. If the storage capacity of the cluster set as the directory entry area upon the creation of the subdirectories becomes short for storing the file information, the device such as a PC or a digital camera secures a new cluster for storing the file information. Then a device such as a PC or a digital camera rewrites the FAT entry corresponding to that cluster and the newly secured cluster. By the above-mentioned process, the device such as a PC or a digital camera can expand the directory entry set upon the creation of the subdirectory and write the file information in the data storage area of the newly secured cluster.

However, in the case of the write-once type storage medium, the FAT entry of the cluster cannot be rewritten even if the capacity of the cluster set as the subdirectory entry area upon the creation of the subdirectory becomes short for storing the file information. Therefore, there arise problems that it is impossible to write file information by expanding the directory entry area set upon the creation of the subdirectory, so that it is impossible to store files in the same subdirectory. That is, there arises a problem that the number of files that can be filed in one directory depends on the cluster size set for the memory card.

According to a first aspect of the present invention, a storage control device includes: a control unit that stores a data file that includes main data and file information in a write-once type storage medium having a data information area containing a plurality of clusters having a predetermined size; an acquisition unit that acquires size information of the clusters from the storage medium; a calculation unit that calculates a number of clusters required for storing file information corresponding to each data file in data storing area using the number of data files to be stored in the storage medium, the size of file information, and the size information of the clusters; and a setting unit that sets a data information area corresponding to the number of clusters calculated by the calculation unit as a storage area for file information.

According to a second aspect of the present invention, the storage control device according to the first aspect is preferably arranged such that the size information of the clusters includes at least one of the cluster size of clusters and a number of sectors contained in the clusters and a sector size of the sectors.

DESCRIPTION OF PREFERRED EMBODIMENTS

Figure 1:
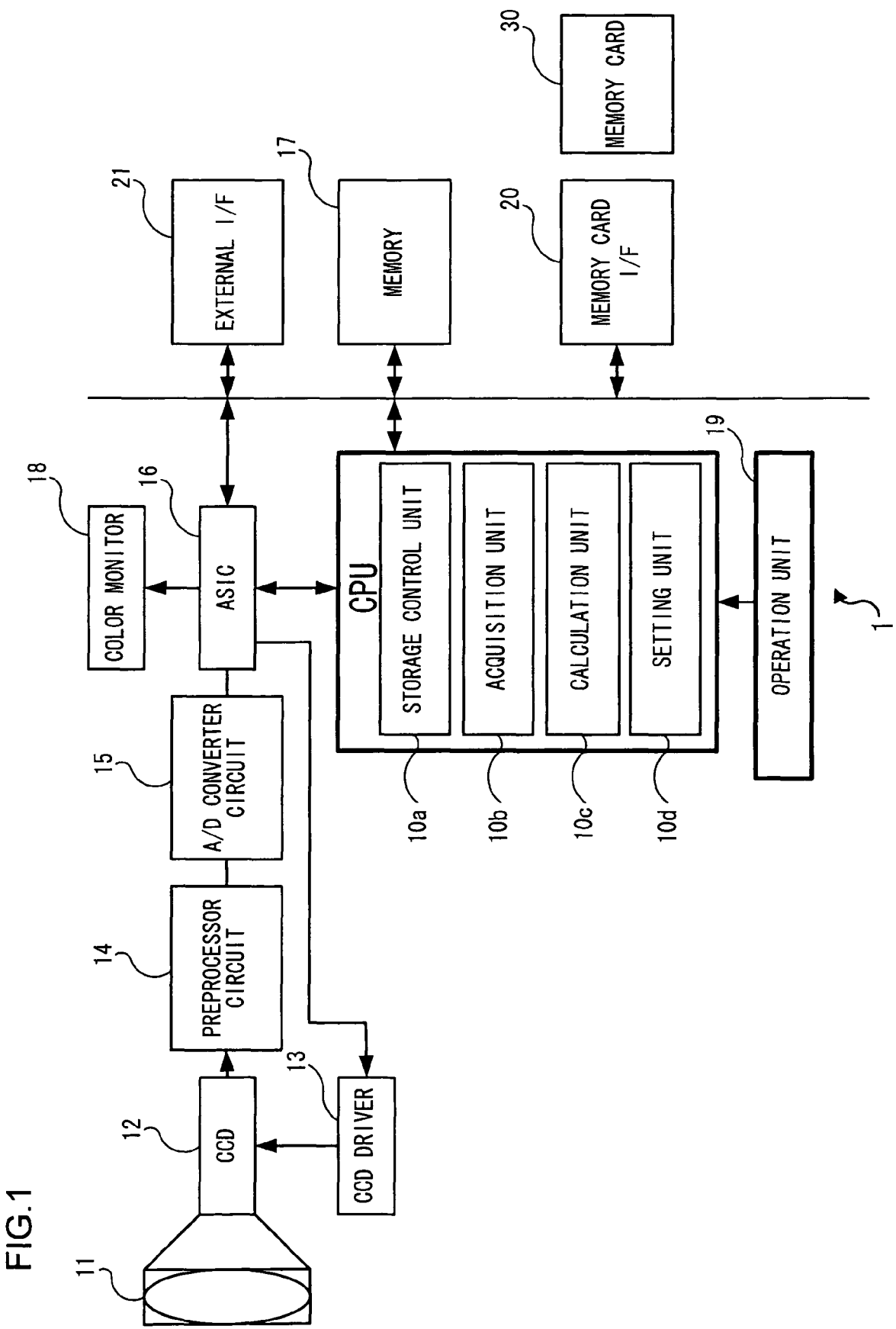
FIG. 1 is a block diagram showing a camera according to an embodiment.

Hereinafter, a camera that includes a storage control device according to one embodiment of the present invention is explained. FIG. 1 is a block diagram showing the configuration of the camera according to a first embodiment. As shown in FIG. 1, a camera 1 includes a lens 11, a CCD 12, a CCD driver 13, a preprocessor circuit 14, an A/D converter circuit 15, an ASIC (Application Specific Integrated Circuit) 16, a memory 17, a color monitor 18, an operation unit 19, a memory card I/F 20, an external I/F 21, and a CPU 10.

The CCD 12 captures light from a subject through the lens 11 to accumulate charges depending on the brightness of the subject and outputs analog signals of the accumulated charges to the preprocessor circuit 14 under control of the CCD driver 13. The preprocessor circuit 14 amplifies the analog signals output from the CCD 12 and performs analog processing such as noise elimination and black level adjustment. The A/D converter circuit 15 converts the analog signals subjected to the analog processing in the preprocessor circuit 14 to digital signals. The ASIC 16 performs image processing such as edge compensation or gamma correction to create image data. The ASIC 16 creates header information data including date and time in which image data was acquired, shutter speed, compression information and so on as well as thumbnail image data obtained by reducing the image data after the image processing to a predetermined size according to the format of Exif (Exchangeable Image File Format). The ASIC 16 compresses the header information data, the thumbnail image data, and the image data after the image processing according to JPEG format or the like to create an image file.

The memory 17 includes a DRAM (Dynamic Random Access Memory) and serves as a working memory used when the CPU 10 executes a program and temporarily stores image data after image processing and soon. The color monitor 18 includes a liquid crystal display and displays images and set information of the camera and so on. The operation unit 19 includes an operation button such as a power switch, a release button, or the like and receives an operation by the user.

The memory card I/F 20 is a connection interface with the memory card 30, which is mountable/demountable. The memory card I/F 20 relays transmission and reception of read/write commands and data and so on between the mounted memory card and the camera 1. The external I/F 21 is a connection interface such as USB and so on in order to connect a device such as PC and so on. The external I/F 21 relays communication between the connected device and the camera 1.

The memory card 30 is a write-once type memory card, which includes a flash memory that stores data, a memory controller that controls write in or read out of data, and a register that stores card attribute information. The memory controller for the memory card 30 controls write in or read out of data in response to the read/write command transmitted from the camera 1 through the memory card I/F 20. The card attribute information contains a data write-in unit, a storage size of the memory card 30, information indicating that the memory card is of the write-once type medium. The memory card 30 is formatted using the FAT file system.

The CPU 10 controls each unit of the camera 10 by executing the program stored in a ROM (not shown). The CPU 10 functionally includes a storage control unit 10*a*, an acquisition unit 10*b*, a calculation unit 10*c*, and a setting unit 10*d*. The storage control unit 10*a* issues a write command or a read command using the FAT file system of the memory card 30 and transfers data between it and the memory card 30. Note that the write command is an instruction to write data file such as an image file in the memory card 30. The read command is an instruction to read out the image file and so on stored in the memory card 30. The acquisition unit 10*b* acquires the storage capacity of the memory card 30, the number of sectors in one cluster, and the number of bytes in one sector as information relating to the capacity of the memory card from the memory card 30 when the memory card 30 is attached to the memory card I/F 20. The calculation unit 10*c* calculates the number of clusters required for storing file information of an image file (data file) into the directory entry area in the FAT file system to be detailed later. The setting unit 10*d* sets (secures), in the directory entry area, clusters in a number that corresponds to the number of clusters calculated.

Figure 2:
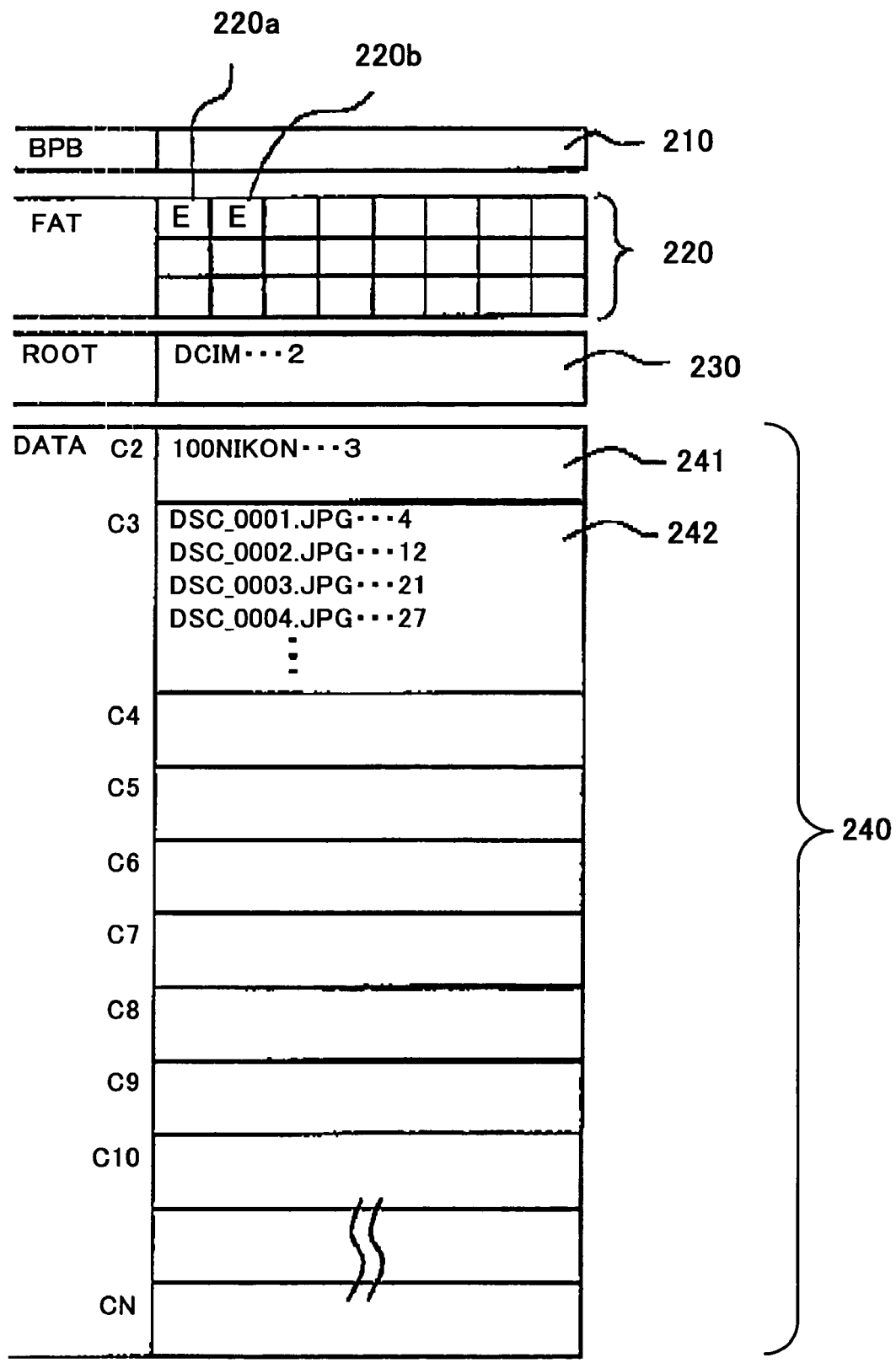
FIG. 2 is a configuration diagram illustrating an FAT file system according to an embodiment.

FIG. 2 is a configuration diagram illustrating an FAT file system. The FAT file system includes a file management area including a BPB (BIOS Parameter Block) 210, an FAT (File Allocation Table) 220, and a ROOT 230, and a data storage area 240 that is administered based on the unit of the cluster including a plurality of sectors. The BPB 210 stores information including the number of sectors contained in one cluster, the number of bytes in one sector, the size of a root directory, the FAT type of FAT 16 or FAT 32, and so on.

As shown in FIG. 2, the ROOT 230 stores a "DCM" folder created according to a DCF format as a root directory and a cluster number "2". The cluster 2 stores a subdirectory "100NIKON" created according to the DCF format directly beneath the root directory.

Each FAT entry of FAT 220 corresponds to each cluster of the data storage area 240 and is arranged in order of the cluster number. For example, an FAT entry 220*a* corresponds to the cluster 2 and an FAT entry 220*b* corresponds to a cluster 3. Each FAT entry stores a cluster number to be read out next to the current cluster or an endmark that indicates completion of read out.

The data storage area 240 includes a plurality of clusters to which serial cluster numbers are assigned starting with the top cluster that has a cluster number of "2". Each cluster stores image data such as a JPEG file and file information of the image file. Note that writing of the image data into the cluster is performed based on the sector unit. Within the sector, edition is possible.

In this example, the ROOT 230 stores the cluster number "2" as a cluster that stores the subdirectory of DCIM. The FAT entry 220*a* of the cluster 2 stores an end mark "E". The data storage area 241 of the cluster 2 stores a subdirectory "100NIKON" and a cluster number "3". The cluster number 3 indicates a directory entry area that stores the file information of the image file to be stored in 100NIKON. The FAT entry 220*b* of the cluster 3 stores the end mark "E". The data storage area 242 of the cluster 3 stores the file information of the image file to be stored in 100NIKON. The file information is determined to have a predetermined size, for example, 32 bytes and includes a JPEG file name created according to the DCF format and a starting cluster number that stores data of JPEG file.

Figure 3:
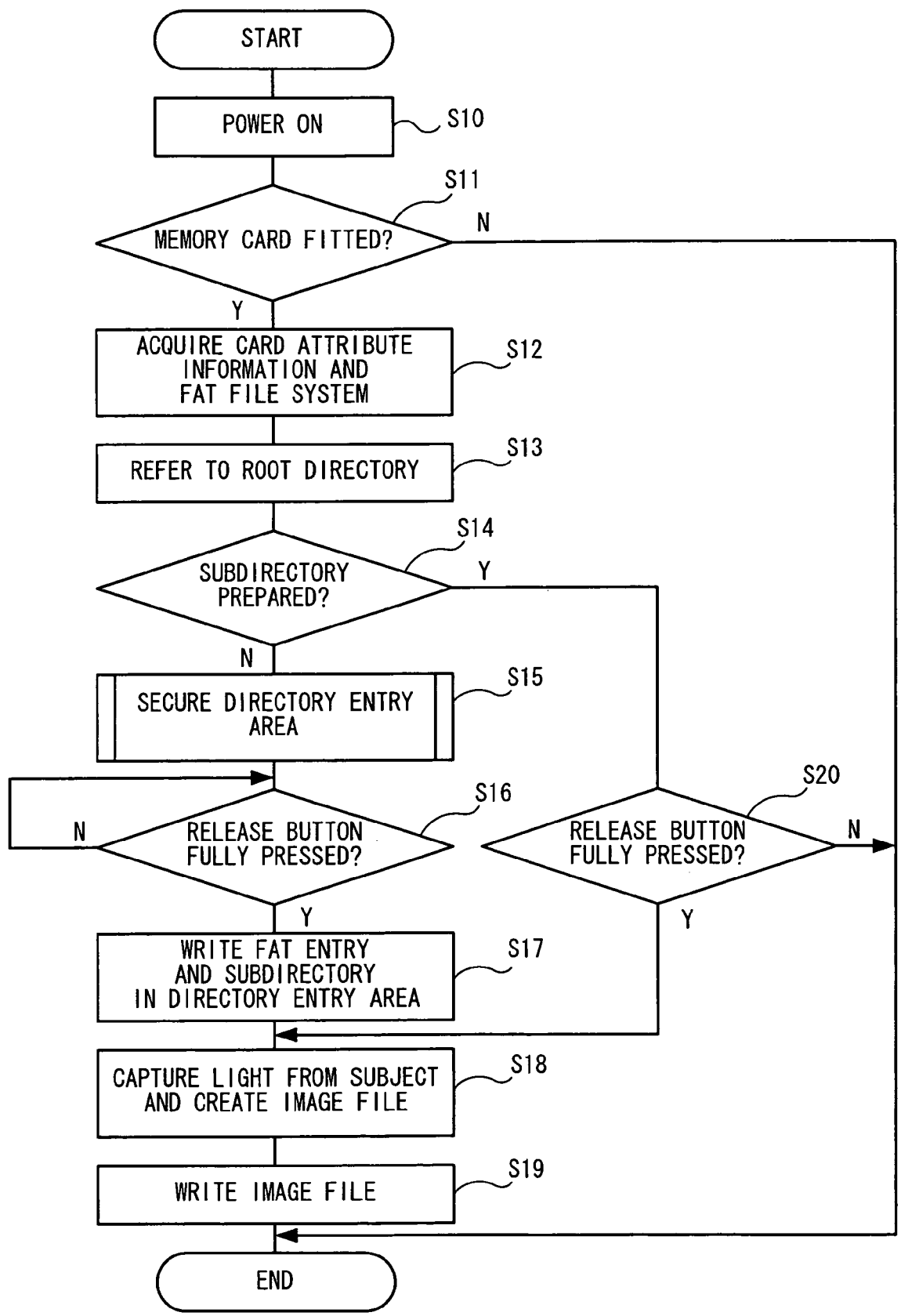
FIG. 3 is a flowchart showing overall operations of a camera according to an embodiment.

Now, the operation of the camera 1 is explained referring to the flowchart shown in FIG. 3. When the power is set ON (step S10) by an operation of the user using the operation unit 19, the CPU 10 judges whether the memory card 30 is fitted to the memory card I/F 20 (step S11). When it is judged that the memory card 30 is fitted to the memory card I/F 20 (step S11: Y), the CPU 10 acquires card attribute information and the FAT file system from the memory card 30. Then, the CPU 10 recognizes that the memory card 30 is a memory card of write-once type from the card attribute information and stores the card attribute information and the FAT file system in the memory 17 (step S12).

The CPU 10 refers to the root directory of the FAT file system acquired in step S12 and judges whether a subdirectory is prepared just below the root directory (step S14). When the CPU 10 has judged that no subdirectory is prepared directly beneath the root directory (step S14: N), the CPU 10 performs directory entry area securing processing for securing the directory entry area for a subdirectory (step S15).

Figure 4:
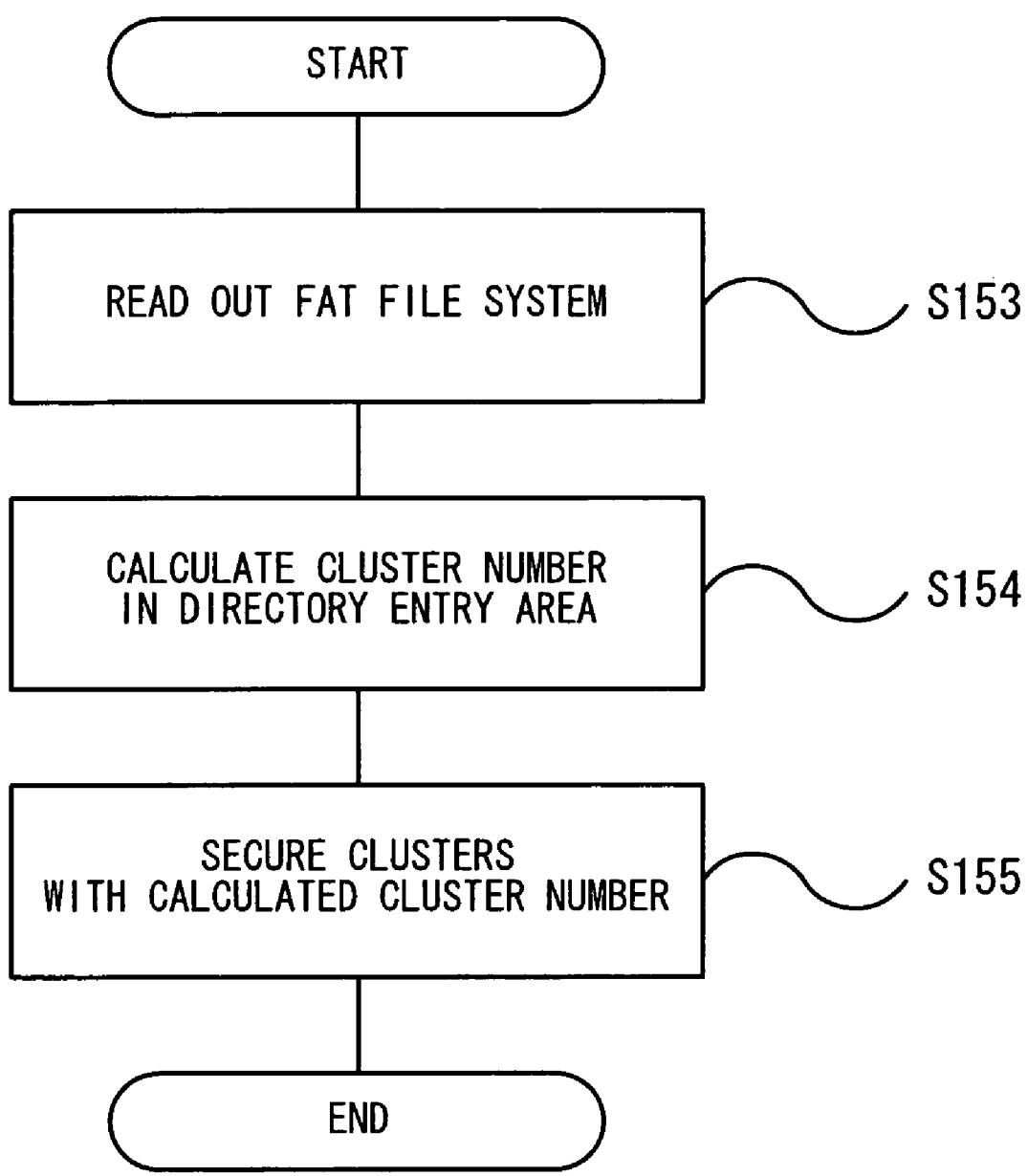
FIG. 4 is a flowchart showing directory entry area securing processing of a camera according to an embodiment.

Hereinafter, the directory entry area securing processing is explained referring to the flowchart shown in FIG. 4. The acquisition unit 10*b* reads out a FAT file system from the memory 17 (step S153) and reads out the number of sectors in one cluster and the number of bytes in one sector stored in the BPB 210. Then, the calculation unit 10*c* multiplies the number of sectors in one cluster with the number of bytes in one sector to calculate a number of bytes per cluster. When the information relating to the capacity read out from the memory 17 contains the number of bytes per cluster, this number of bytes is used as it is as the size of one cluster.

The calculation unit 10*c* calculates the number of clusters in the directory entry area (step S154). That is, the calculation unit 10*c* multiplies a maximum number of files that can be stored in one directory, which number has been set in advance at the time of production or freely set by the user, with the number of bytes per file information (for example, 32 bytes), and divide the result with the number of bytes per cluster to calculate the number of clusters. Note that when a remainder is left (a fractional part exists), the calculation unit 10c rounds up the value. The setting unit 10d secures FAT entries that correspond to clusters in the number of clusters calculated in step S154 on the FAT 220 (step S155)

Referring back to FIG. 3, when the release button of the operation unit 19 is fully pressed by the user (step S16: Y), the storage control unit 10a writes the order of reading out in FAT entries corresponding to the clusters other than the last one among the clusters secured by the setting unit 10d in step S155. Then, the storage control unit 10a issues a write command referring to the ROOT 230 and the FAT 220 in the FAT file system to cause the starting cluster numbers in the FAT entry, the subdirectory, and the directory entry area to be written in the memory card 30 (step S17). The write command is an instruction to write the subdirectory created according to the DCF format and the starting cluster number among the clusters secured by the setting unit 10d in step S155 in the data storage area of the cluster that stores the subdirectory of DCIM. The CPU 10 creates an image file based on the captured signal output from the CCD 12 after capturing of an image of a subject, and stores the image data (main data) of the image file in the memory 17 (step S18).

Subsequent to step S18, the storage control unit 10a reads out image data from the memory 17 and issues a write command. The write command is an instruction to secure an FAT entry corresponding to a cluster that stores the read out image data on the FAT 220 and write the file name created according to the DCF format and the starting cluster number for storing the image file in the data storage area corresponding to the cluster set as the directory entry area. The memory card 30 writes the file name and the starting cluster number of an image file in the data storage area in response to the write command. The storage control unit 10a issues a write command. The write command causes the order of reading out and an end mark to be written in the FAT entry corresponding to the secured cluster and image data to be written in the data storage area corresponding to the secured cluster. The memory card 30 performs writing into the FAT entry and the data storage area according to the write command (step S19).

The CPU 10 ends the processing in the following cases. That is, (1) when it is judged that no memory card 30 has been fitted in step S11 (step s11: N) or (2) when it is judged that a subdirectory has been prepared directly beneath the root directory in step S14 (step S14: Y), and the release button has not been fully pressed by the user in step S20 (step S20: N).

The CPU 10 performs the processing in step S18 and subsequent steps when it is judged in step S14 that a subdirectory has been prepared directly beneath the root directory (step S14: Y) and it is judged in step S20 that the release button has been fully pressed by the user (step S20: Y). When it is judged in step S16 that the release button has not been fully pressed by the user (step S16: N), the CPU 10 performs the processing in the step S16 and subsequent steps.

Figure 5:
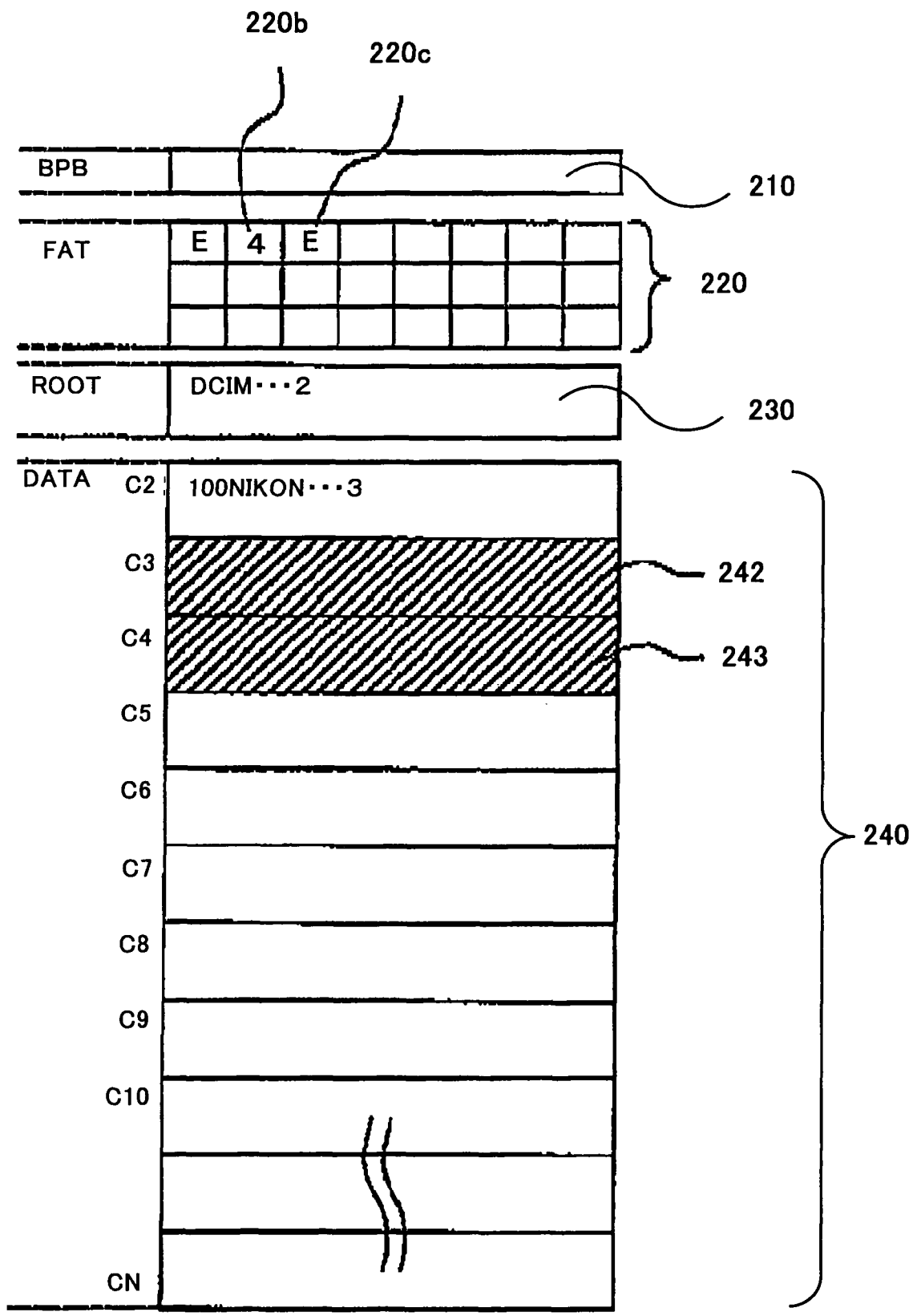
FIG. 5 is a diagram showing an example of the FAT file system after the directory entry area has been set in an embodiment.

FIG. 5 shows an example of the FAT file system of which directory entry area securing processing has been performed and writing has been performed in the FAT entries corresponding to the clusters secured as directory entry areas. FIG. 5 shows the case in which a cluster 3 and a cluster 4 have been secured by the setting unit 10d as directory entry areas of the subdirectory "100NIKON". In this case, the cluster number 4 to be read out next to the cluster 3 is stored by the storage control unit 10a in the FAT entry 220b of the cluster 3. In the FAT entry 220c of the cluster 4, the end mark "E" that indicates an end of the directory entry area of "100NIKON" is stored by the storage control unit 10a.

Therefore, when image files are sequentially stored in the memory card 30 using the FAT file system, the file information of each image file is sequentially stored form the top sector of the data storage area 242 of the cluster 3. When file information can be no longer stored in the data storage area 242 of the cluster 3, then the file information is sequentially stored from the top sector of the data storage area 243 of the cluster 4.

In the above-mentioned embodiment, the number of clusters that allows storage of file information corresponding to the maximum storable number of files is calculated in order to secure directory entry areas when a write-once type memory card is fitted. The clusters corresponding to the calculated number of clusters can be secured on the data storage area 240. As a result, it can be prevented from occurring that file information cannot be stored in the directory although the clusters are in a number less than the maximum storable file number.

Note that in the above-mentioned embodiment, although explanation has been made using a camera as an example of the storage control device, the storage control device may be an information device such as a cellular phone, PDA, PC or the like, to which a write-once type storage medium can be fitted.

In the above-embodiment, explanation has been made assuming that the data size of each piece of file information is of 32 bytes. However, 16 bytes or the like data size may also be used.

In the above-mentioned embodiment, explanation has been made assuming that calculation is made of the number of clusters in the directory entry area that stores file information in an amount corresponding to the maximum number of files that can be stored in the memory card 30. However, the calculation unit 10c may be configured to calculate the number of clusters that can store file information in an amount that corresponds to the file number that can be stored in the memory card 30 and the setting unit 10d may be configured to secure clusters in an amount corresponding to the calculated cluster number. Note that in this case, the calculation unit 10c calculates the number of storable files in case no file data is stored in the memory card 30. In this case, the acquisition unit 10b reads out the card attribute information from the memory 17 and acquires the storage capacity of the memory card 30 contained in the card attribute information. The calculation unit 10c divides the storage capacity of the memory card 30 by a predetermined average data size per file to calculate a number of files that can be stored in the memory card 30. Then the calculation unit 10c calculates a number of clusters in the directory entry area that stores the file information in an amount corresponding to the calculated number of storable files. With this configuration, all the storage files can be stored in one directory in the setting in which files are stored in a predetermined average data size per file. In the case of the memory card in which data has already been stored, the calculation unit 10c may calculate a remaining storage capacity of the memory card 30 based on the storage capacity of the memory card 30 and the cluster size of the cluster on which data is stored.

The above described embodiments are examples, and various modifications can be made without departing from the scope of the invention.

What is claimed is:

1. A storage control device comprising:
    a control unit that stores a data file that includes main data and file information in a write-once type storage medium having a data storing area containing a plurality of clusters having a predetermined size;

an acquisition unit that acquires a FAT file system from the storage medium;

a decision making unit that decides whether or not a subdirectory is prepared below a root directory based upon the FAT file system;

a calculation unit that calculates a number of clusters required for storing file information corresponding to each data file in the data storing area, by using the number of data files to be stored in the storage medium, a size of file information, and size information of the clusters based upon the FAT file system, when the decision making unit decides the subdirectory is not prepared below the root directory; and a setting unit that sets the data storing area corresponding to the number of clusters calculated by the calculation unit as a storage area for file information.

2. A storage control device according to claim 1, wherein size information of the cluster includes at least one of a cluster size of the cluster, and a number of sectors contained in the cluster and a sector size of the sectors.

3. A storage control device according to claim 1, wherein the calculation unit does not calculate the number of clusters required for storing file information corresponding to each data file in the data storing area, by using the number of data files to be stored in the storage medium, the size of file information, and the size information of the clusters based upon the FAT file system, when the decision making unit decides the subdirectory is prepared below the root directory.

4. A storage control device according to claim 1, further comprising:

a second decision making unit that decides whether or not the storage medium is connected, when a power is set ON in accordance with an operation of a user; wherein the acquisition unit acquires the FAT file system from the storage medium when the second decision making unit decides that the storage medium is connected.

* * * * *